INVENTORS
JOHN A. ALTONJI &
JOSEPH G. VAIANA

BY
Lane, Aitken, Dunner & Ziems
ATTORNEYS

INVENTORS
JOHN A. ALTONJI &
JOSEPH G. VAIANA
BY
Lane, Aitken, Dunner & Ziems
ATTORNEYS June 30, 1970 J. A. ALTONJI ET AL 3,518,647

LATERALLY LOADED TAPE MECHANISM WITH RETRACTIBLE BACK AND EDGE GUIDES

Filed Sept. 22, 1966 4 Sheets-Sheet 3

INVENTORS
JOHN A. ALTONJI &
JOSEPH G. VAIANA

BY Lane, Aitken, Dunner & Ziems
ATTORNEYS

June 30, 1970 J. A. ALTONJI ET AL 3,518,647

LATERALLY LOADED TAPE MECHANISM WITH RETRACTIBLE BACK AND EDGE GUIDES

Filed Sept. 22, 1966 4 Sheets-Sheet 4

INVENTORS
JOHN A. ALTONJI &
JOSEPH G. VAIANA

BY Lane, Aitken, Dunner & Ziems
ATTORNEYS

United States Patent Office 3,518,647

Patented June 30, 1970

3,518,647

LATERALLY LOADED TAPE MECHANISM WITH RETRACTIBLE BACK AND EDGE GUIDES

John A. Altonji, Syosset, and Joseph G. Vaiana, Levittown, N.Y., assignors to Potter Instrument Company, Inc., Plainview, N.Y., a corporation of New York Filed Sept. 22, 1966, Ser. No. 581,257

Int. Cl. G11b *15/62, 15/66*

U.S. Cl. 340—174.1 17 Claims

ABSTRACT OF THE DISCLOSURE

A tape guide apparatus for high speed information storage and retrieval apparatus of the type in which cartridge contained storage tapes are loaded laterally into position relative to a transducing head. The guide apparatus is retractibly mounted on a cartridge support in the storage apparatus to facilitate the lateral tape loading and is movable to an advanced transducing position at which it accurately guides the tapes relative to a transducing head as they move longitudinally relative thereto in the conduct of transducing operations.

Figure 1:
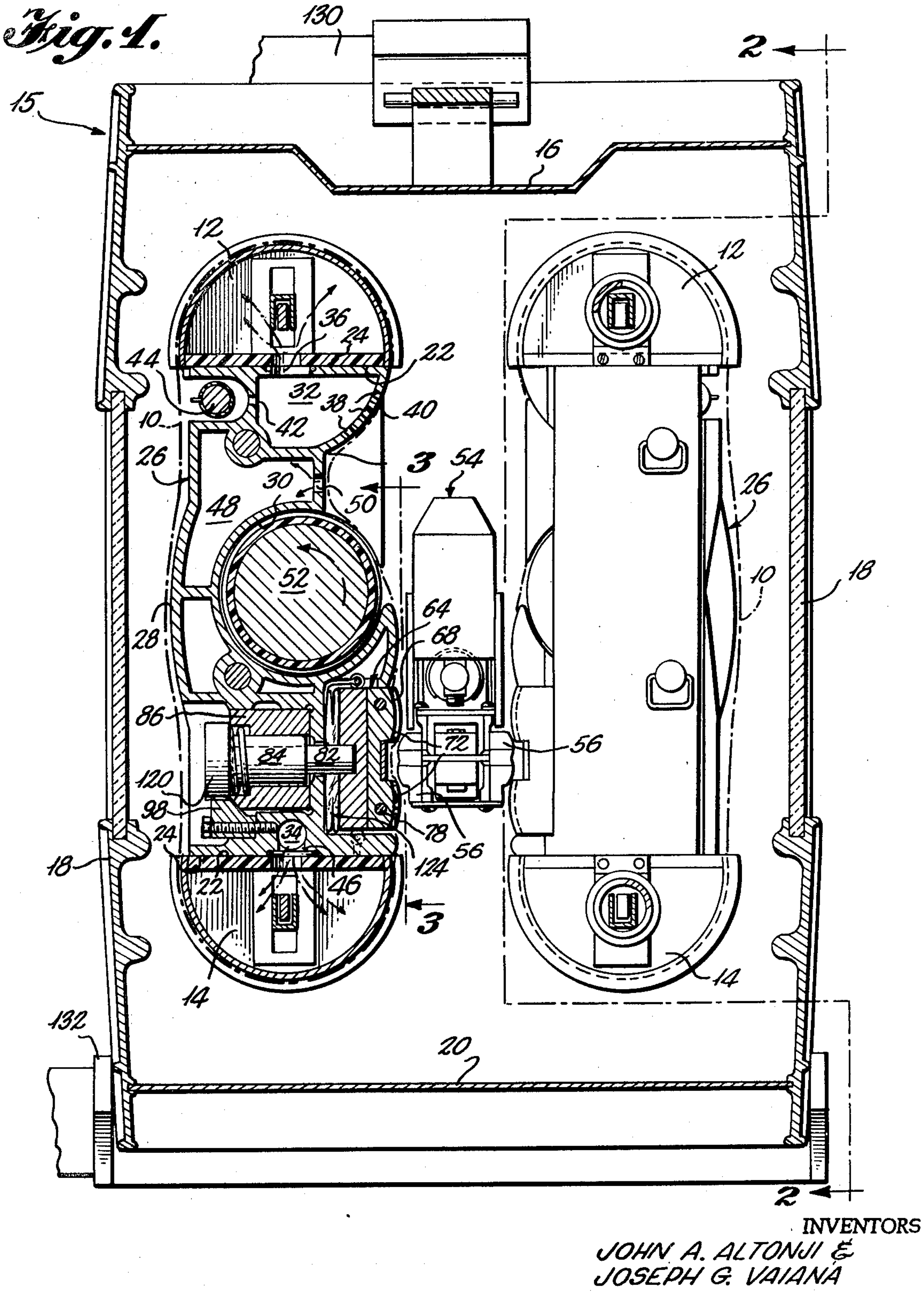

This invention relates to tape guide mechanisms of the type used in random access memory installations, and more particularly, it concerns a retractable guide mechanism particularly suited for use in information storage devices and/or tape handling apparatus of the type in which a magnetic storage tape, contained in a cartridge, is moved into position relative to a transducing head when the cartridge is mounted for transducing operations.

In a copending application Ser. No. 535,747, filed Mar. 21, 1966, by Andrew Gabor and assigned to the assignee of the present invention, there is disclosed an improved random access memory apparatus by which information is stored on a plurality of magnetic tape loops carried in each of a plurality of interchangeable cartridges. The tape loops in either of one or two cartridges, in use, are driven at high speeds relative to a transducing head assembly, which in turn is selectively positionable so that transducer heads carried thereon are registered with information tracks on the respective tape loops. In the system disclosed in the aforementioned application, and in the interest of obtaining maximum density of information storage, it is essential that the information tracks on each tape be accurately dimensioned and spaced very close to one another. Accordingly, it is essential that the storage tapes be positioned very accurately with respect to the transducing head positions by which the tracks are established particularly since the tracks formed during recording must be capable of reregistration with the transducing heads for readout operations. Also, it is necessary that any means provided for constraining the tapes in a transverse position relative to transducing heads being retractable so that the tapes or tape loops may be moved into position in a lateral direction, or in a direction normal to the transducing heads, because the tapes are carried into such position with the cartridge in which they are supported.

In accordance with the present invention, an improved guide mechanism is provided by which one or more tapes, depending upon the number of tapes carried by the cartridge employed, may be accurately positioned relative to a transducing head assembly. Generally, the guide mechanism includes a trough guide for each tape to establish both a surface for guiding the back or non-recording surface of the respective tapes, and mutually facing edge guiding surfaces spaced at a precisely established distance relative to the transverse dimension or width of the tape. To facilitate movement of the tapes to a transducing position in a direction parallel to the width or transverse dimension of the tapes, the trough guides are supported on a retractable mount so that the tape engaging portions, particularly the edge guiding portions of the mechanism may be moved between a retracted position, spaced substantially from a transducing head to facilitate movement of the tapes between the transducing heads and the guiding mechanism, and an operative or working position wherein the guide is accurately positioned to constrain the tapes for precision movement past the transducing head. The present invention also contemplates the use of air pressure provided in the storage apparatus, for supporting the tapes during movement on an air bearing, to effect the movement of the tape guide mechanism between the retracted and operative positions aforementioned. To this end, inflatable hermetically sealed bags are provided and connected to the source of air pressure so that when the air pressure is used to develop the air bearing for supporting the moving tapes, the bags will be inflated simultaneously to move the guide mechanism into its operative or working position. When the tape drive is discontinued, and the supply of air terminated, the bags deflate to permit retraction of the guide mechanism under a return spring bias. Further, and to facilitate the measure of accuracy required in this environment, the guide mechanism is supported from a mount capable of accurate adjustment relative to the transducing head by which tape reading and writing operations are carried out.

Among the objects of the present invention are: the provision of an improved guide mechanism for positioning magnetic storage tapes very accurately relative to transducing head assembly; the provision of a retractable mount for such guide mechanisms by which the working position of the guide may be adjusted very accurately; the provision of a unique, highly effective, and yet low cost arrangement for moving the guide mechanism between a retracted position at which the tapes may be moved into position relative to a transducing head, and a working position at which the guide mechanism may operate to constrain the tape very accurately to a pre-established path during movement past the transducing head assembly; and the provision of a tape guide mechanism of the type aforementioned which contributes to the quality of information storage on magnetic tapes.

Figure 2:
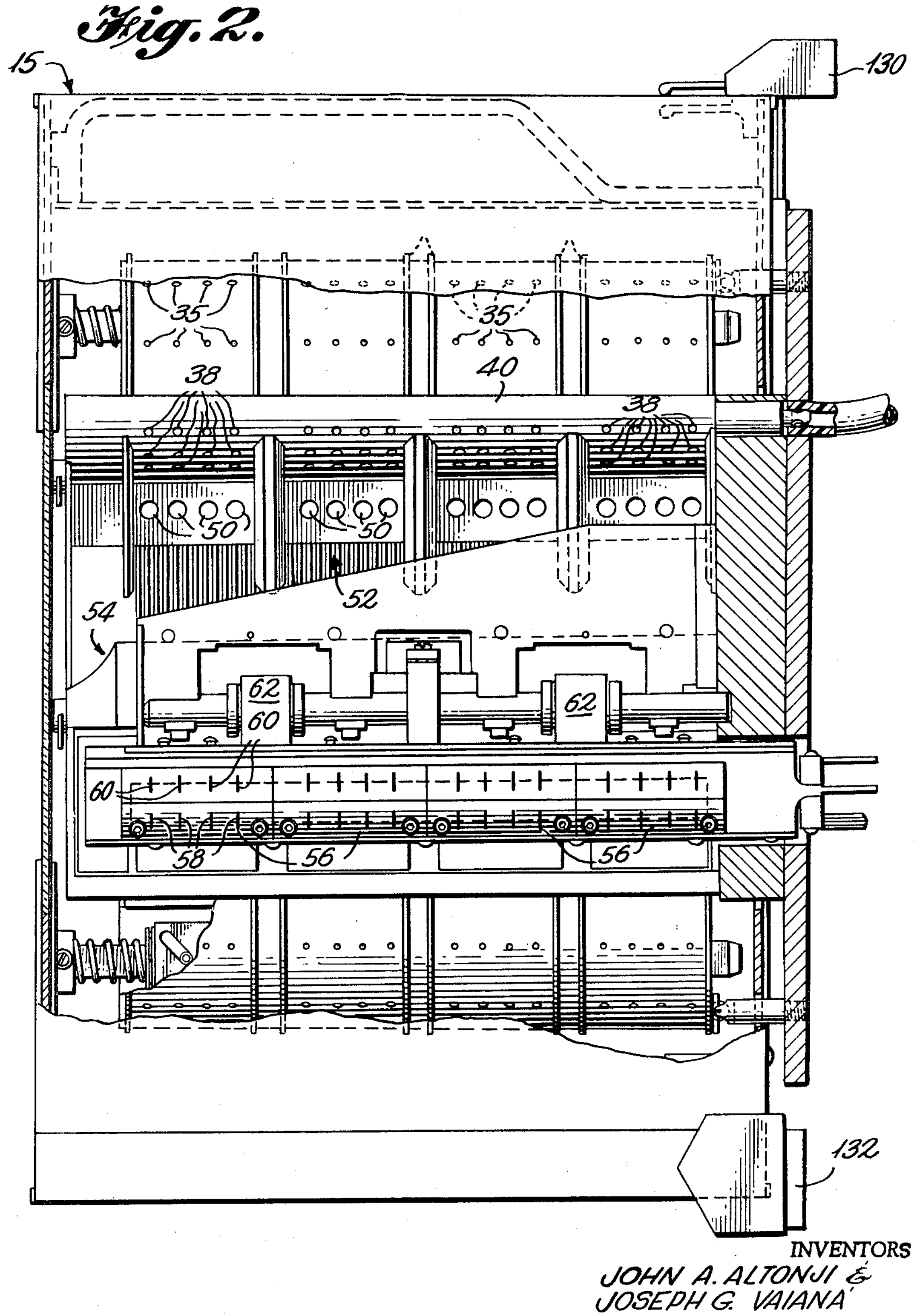
Figures 3, 4:
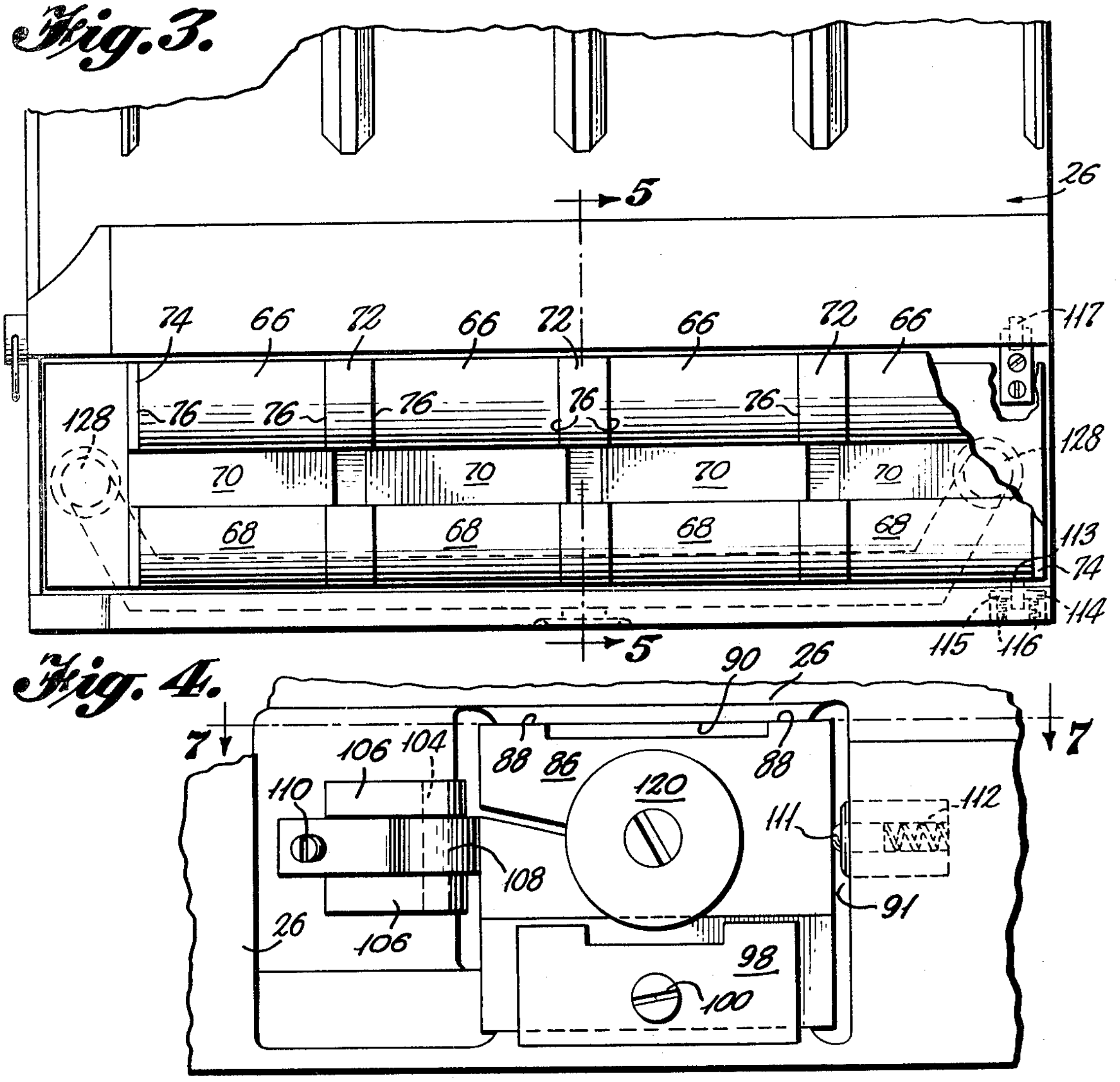
Figure 7:
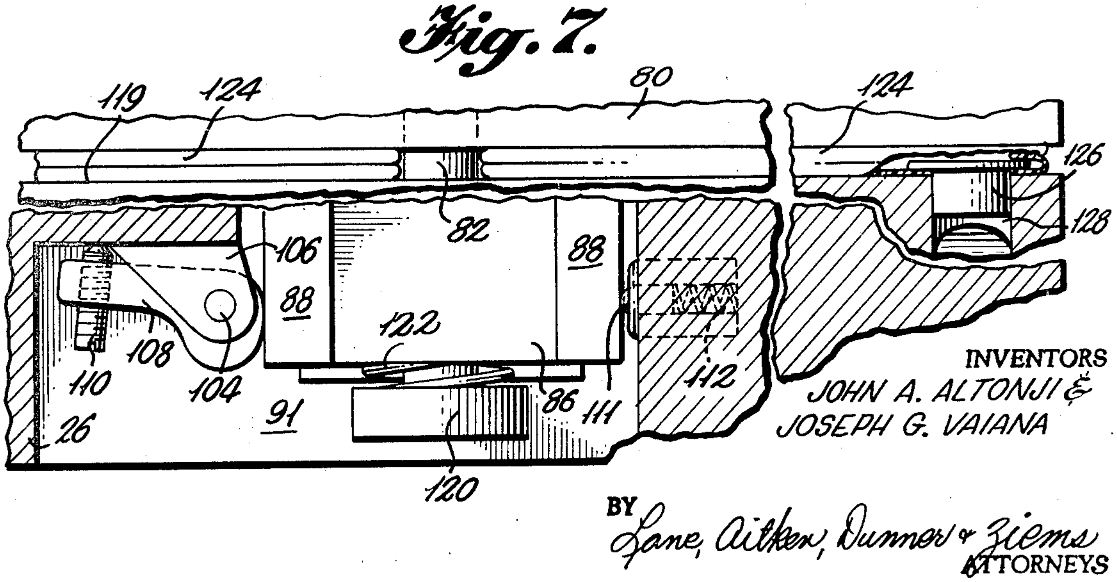
Figure 6:
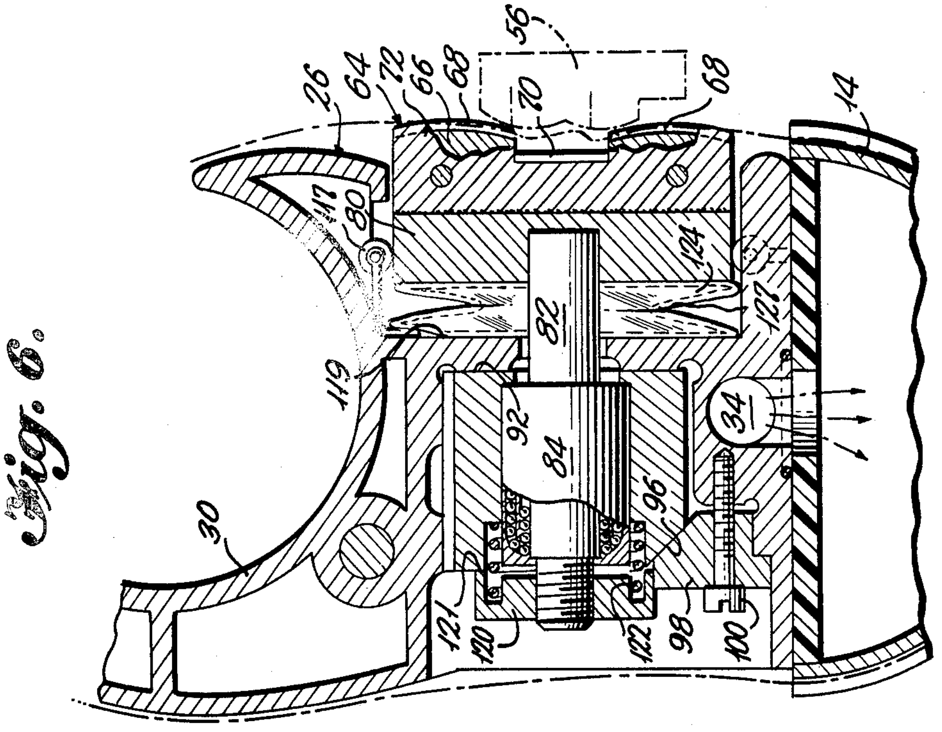
Figure 5:
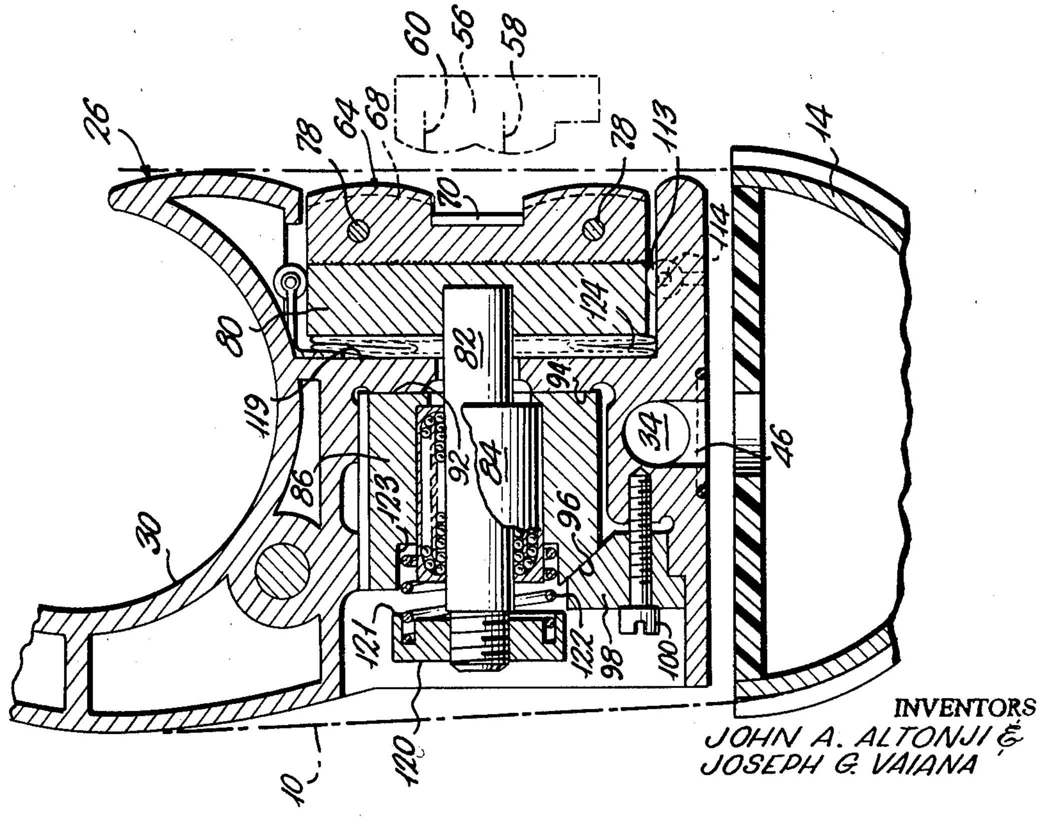

Other objects and further scope of applicability of the present invention will become apparent from the detailed description to follow taken in conjunction with the accompanying drawings in which like reference numerals designate like parts and wherein: FIG. 1 is a partial cross-section taken through a cartridge and transducing mechanism of a random access memory device with which the guide mechanism of this invention is used; FIG. 2 is a fragmentary cross-section taken on line 2—2 of FIG. 1; FIG. 3 is an enlarged fragmentary front elevation of the tape guiding mechanism of this invention as viewed from line 3—3 of FIG. 1; FIG. 4 is an enlarged fragmentary rear elevation of the guide mechanism and its mount; FIG. 5 is an enlarged fragmentary cross-section taken on line 5—5 of FIG. 3; FIG. 6 is a fragmentary cross-section similar to that of FIG. 5 but showing the components of the guide mechanism in a different position; and FIG. 7 is a fragmentary cross-section, partially cut away, taken on line 7—7 of FIG. 4.

The principal working components of the random access memory shown in copending application Ser. No. 535,747, filed Mar. 21, 1966, are illustrated in FIGS. 1 and 2 of the drawings to facilitate a complete understanding of the guide mechanism of this invention and the manner in which it is used. As shown in FIGS. 1 and 2, a plurality of magnetic tape loops, designated by the reference numeral 10, are supported in a generally oblong configuration between pairs of upper and lower turn-arounds 12 and 14, which in turn are supported by a cartridge 15 having top, side and bottom walls 16, 18 and 20, respectively. The turn-arounds have manually facing flat surfaces 22 to seat against similar flat surfaces 24 provided at the top and bottom of a drive block generally designated by the reference numeral 26. Each of the drive blocks (two being employed with each cartridge in the arrangement shown in FIGS. 1 and 2) is formed with an arcuate rear surface 28 and a cylindrical capstan well 30. The drive blocks further include a pressure chamber 32 communicating by suitable manifold means (not shown) with a pressure duct 34. The chamber 32 communicates through a port 36 to the interior of the upper turn-around 12 which has ports 35 through a semi-cylindrical surface thereon to develop an air bearing for the tape 10 during transducing operations. The chamber 32 further communicates through ports 38 to an arcuate surface 40 to develop a further air bearing for the tape and also through ports 42 to bleed air over an electrostatic discharge device 44. The duct 34 is similarly in communication with the lower turn-around 14 through a port 46 to develop an air bearing about its rounded or semi-cylindrical surface. A vacuum chamber 48 provided in the drive block 26 and connected to a source of vacuum (not shown) draws air in through ports 50 to move the tapes 10 into frictional engagement with a rotatable capstan 52.

Positioned between the drive blocks 26 is a transducing head assembly generally designated by the reference numeral 54. The transducing head assembly carries a plurality of head modules 56, each having a series of four write heads 58 and four read heads 60. The head modules are supported on movable carriages 62 and controlled by a mechanism (not shown) in such a manner that it may be moved to any one of a plurality of incremental head positions. Specifically, twenty-eight such incremental positions are available thus enabling each of the heads 58 or 60 to perform transducing operations on 28 separate tracks. Since there are four write heads 58 and four read heads 60 for each tape, one hundred thirty-two tracks are provided on each tape 10. A more complete description of the transducing operation may be had by reference to the aforementioned application Ser. No. 535,747. For purposes of gaining a complete understanding of the present invention, however, a further description of these details is deemed unnecessary herein.

The tape guiding mechanism of this invention, and the manner in which it is mounted on the drive blocks 26, is illustrated most clearly in FIGS. 3–7 of the drawings, though this mechanism, in part, is also visible in FIG. 1. As shown in FIGS. 3, 5 and 6 of the drawings, the tape guiding mechanism includes a trough guide assembly generally designated by the reference numeral 64 and including a plurality (four in the embodiment shown) of trough guide blocks 66 each having a pair of spaced, rounded guide surfaces 68 developed by lines extending in parallel with the tape width and serving as a back guide for each tape 10. A shielding strip 70 of magnetic material, such as ferrite, is received in a track-like recess or groove between the guide surfaces 68. The assembly 64 further includes spacer blocks 72 positioned between the intermediate ones of the trough guide blocks 66 and end blocks 74. The spacer and end blocks 72 and 74 project forwardly of the surfaces 68 to establish mutually facing edge guide surfaces 76 to constrain each tape 10 in a precisely defined position or path relative to the transverse dimension or width of each tape. A pair of rods 78 extend laterally through the blocks 66, 72 and 74, respectively. The assembly 64, thus secured by the rods 78, is bonded to a supporting plate 80 by suitable cement such as epoxy resin. While various other techniques might be employed to secure the assembly 64 to the plate 80, the use of a settable resinous material is preferred. It will be appreciated that the assembly of the trough guide blocks 66, spacer blocks and end blocks 74 must be positioned properly with respect to the plate 80. By using a settable material, the ultimate operating position of the assembly 64 may be established, such as by an appropriate jig or the like (not shown), and the plate 80 moved against the assembly so that the resinous material will flow slightly to correct for any minor misalignment problems that might occur. Upon setting, the correct positioning of the assembly on the plate is established.

The mounting plate 80 is suitably secured, such as by press fitting, welding, or the like, to the forward end of a shaft 82 supported for precise rectilinear movement by a linear ball bearing 84. The bearing 84 is, in turn, press fit within a slotted mounting block 86 having a pair of elevated, precisely machined surfaces 88 on each end at the upper surface thereof which engage an accurately machined surface 90 formed at the top of a well 91 in the drive block 26. The mounting block 86 further is formed with a front machined surface 92 perpendicular to the surfaces 88 for engaging a complementary, accurately machined surface 94 on the drive block 26. The lower rear corner of the block 86 is formed with an inclined or bevelled surface 96 for engagement by a wedge block 98 adapted to be drawn forwardly against the mounting block by suitable means such as a machine screw 100. Thus, it will be appreciated that the position of the shaft 82 is very accurately fixed in a vertical plane passing through the axis thereof by virtue of the wedge block 98 constraining the block 86 against the machined surfaces 90 and 94 in the well 91 in the drive block 26.

To establish the position of the shaft 82 in a horizontal plane, the means illustrated in FIGS. 4 and 7 is provided. This means includes a cam member 102 pivoted about the axis of a pin 104 extending through the cam and a pair of bracket members 106. The cam member is provided with an arm portion 108 tapped to receive a set screw 110 so that as the screw is threaded inwardly, the cam member will act against one edge of the drive block 86 to move it away from the pin 104 in a horizontal plane. The opposite edge of the drive block abuts a plunger 111 biased toward the left as viewed in FIG. 7 by a heavy coil spring 112. Hence, it will be seen that because of the arrangement of the cam 102 and the plunger 111, just prior to tightening or drawing up of the screw 100, the position of the mounting block 86 and thus of the shaft 82 may be very accurately positioned by adjusting the set screw 110. Then, after the precise position is reached, the screw 100 is tightened to secure the entire assembly in place.

It will be seen, therefore, that the mounting block will accurately position the shaft 82 on a precisely defined axis. Further positioning of the trough guide assembly 64 angularly about the axis of the shaft 82 is also required. To this end, a roller 113 on an axle 114 is secured against the base of slot 115 in the drive block 26 by a pair of set screws 116. By providing a yieldable material in the base of the slot 115, the precise vertical position of the roller 113 may be established. The roller 113 is positioned under the plate 80 at one end thereof to establish the precise angular or pivotal position of the plate and thus of the trough guide assembly 64 on the axis of the shaft 82. To insure contact of the plate 80 with the roller 113 at all times, a further roller 117 is journaled on a resilient bracket 118 and engages the upper surface of the plate 80 at a position directly above roller 113. The bracket is suitably secured against a surface 119 on the drive block 26 such as by screws, welding or the like.

The read end of the shaft 82 is threaded to receive a nut 120 having an annular abutment surface 121 to engage the rear surface of the mounting block 86. A helical compression spring 122 is received in a counterbore 123 formed in the mounting block 86 to urge the nut and thus the shaft 82 yieldably to a rearward or retracted position.

Positioned between the rear surface of the trough guide assembly mounting plate 80 and the surface 119 in the drive block 26 are a pair of flexible, inflatable bags 124 having an opening for receiving flanged nipples 126. Each of the bags 124 is formed of flexible, impervious material, such as polyethylene, and have gussets 127 extending about their peripheries to effect a self-contained bellows-like structure. The nipples 126 are received in and establish a fluid communication between the bag interior and ports 128 in the wall 119 and connected with the pressure duct 34 in the drive block. Hence, upon inflation of the bags 124, the plate 80 and thus the trough guide assembly 64 will be moved forwardly to an operative position, such as illustrated in FIG. 6 of the drawings, against the bias of the compression spring 122. Conversely, upon release of the pressure in the bags 124, the spring will return the trough guide assembly to it retracted position shown in FIG. 5.

In the operation of the random access memory apparatus illustrated in FIGS. 1 and 2 of the drawings, the tapes 10 are moved into a transducing position relative to the transducing head modules 56 by mounting the cartridge 15 on a carrier including upper and lower arms 130 and 132. The entire cartridge 15 is then moved over the drive blocks 26 by the carriage mechanism. During initial movement of the cartridge over the drive blocks, the turn-arounds 12 and 14 are urged away from each other yieldably to impose a slight tension on the tap 10. Also, during this phase of the loading operation, the pressure chambers 32 and 34 as well as the vacuum chamber 48 are inactive. Accordingly, the spring 122, acting against the nut 120 on the shaft 82, retains the trough guide assembly 64 in its retracted position as shown in FIG. 5 of the drawings. As the cartridge 15 approaches its home or operative transducing position, and the turn-arounds 12 and 14 are moved toward the surfaces 24 at the top and bottom of each drive block 26 and the vacuum chamber is energized sufficiently to take up slack in the tapes 10. As soon as the final transducing position of the cartridge and thus of the turn-arounds and tapes is reached, air pumps (not shown) are energized to supply compressed air to the chamber 32 and duct 34; full vacuum is applied to the chamber 48; and the capstans 52 are rotatably driven at high speeds to move the tapes 10 in a path around the turn-arounds and drive block as shown generally in FIG. 1 of the drawings. Since the duct 34 is in direct communication with the inflatable bags 124 through the flanged nipples 126, the bags will also be inflated simultaneously with the development of air pressure in the duct 34 which occurs simultaneously with rotation of the capstan 52 and operation of the other tape drive components of the memory apparatus. Accordingly, the trough guide assembly is moved to its transducing position as shown in FIG. 6 to guide the tapes 10 accurately past the transducing head modules 56 and the respective write and read heads 58 and 60 therein.

Thus, it will be appreciated that by this invention an extremely effective tape guiding mechanism is provided which particularly is suited for use with a random access memory apparatus of the type depicted in FIGS. 1 and 2 of the drawings. It is contemplated, however, that the tape guide mechanism of this invention will find application in other specific types of random access memory and tape handling systems, particularly where air is employed to provide a fluid bearing on which the tapes ride during transducing operations. The device lends itself to such an arrangement principally because of the ease with which the guide may be moved into operative position relative to the transducing head simultaneously with the development of such an air bearing.

It is contemplated that further specific applications of the present invention, as well as various modifications thereof, will become apparent to those skilled in the art from the description given herein. Accordingly, it is expressly intended that the foregoing description is illustrative of a preferred embodiment only, not limiting, and that the true spirit and scope of the present invention is to be determined by reference to the accompanying claims.

The invention claimed is:

1. In an information storage apparatus of the type in which a cartridge contained tape is loaded laterally into position relative to a transducing head, a retractible guide for constraining the tape to a precisely fixed path during movement longitudinally relative to the head for transducing operations, said guide comprising: trough guide means defining a back guide surface extending in parallel relation to the transverse dimension or width of the tape and mutually facing edge guide surfaces fixedly projecting from said back guide surfaces; means to mount said trough guide means for movement between a retracted position in which the tape may be loaded laterally in a direction parallel to said back guide surface and a transducing position in which the tape is constrained by said back and edge guide surfaces in an operative transducing path; and means to drive said trough guide means between said retracted and transducing positions.

2. The apparatus recited in claim 1 including spring means to return said trough guide means from said transducing position to said retracted position.

3. The apparatus recited in claim 1 in which said guide means comprises an assembly of at least one trough guide block to establish said back guide surface and a pair of edge guide blocks secured in abutting relation against the ends of said trough guide block.

4. The apparatus recited in claim 3 in which said mounting means includes a plate member and in which said trough guide assembly is bonded to said plate member by a settable plastic cement.

5. The apparatus recited in claim 3 in which said trough guide block is shaped to provide a pair of discrete rounded surfaces generated by lines extending parallel to the width of the tape.

6. The apparatus recited in claim 4 in which said trough guide blocks have a groove formed between said rounded surfaces and include a magnetic shielding strip in said groove.

7. The apparatus recited in claim 1 including a support means for carrying the storage tape during movement thereof relative to the transducing head.

8. The apparatus recited in claim 1 in which said drive means includes pneumatic force transmitting means operable between said support and said trough guide means to move said trough guide means to said transducing position.

9. The apparatus recited in claim 8 in which said pneumatic force transmitting means comprises at least one inflatable bag and including further, spring means to return said trough guide means to said retracted position.

10. The apparatus recited in claim 9 in which said bag includes peripheral gussets to effect a self-contained bellows-like structure.

11. Apparatus for guiding an information storage tape during movement of the tape in a path relative to a transducing head, said apparatus comprising: support means for carrying the storage tape during movement thereof relative to the transducing head; trough guide means defining a back guide surface extending in parallel relation to the transverse dimension or width of the tape and mutually facing edge guide surfaces projecting from said back guide surfaces; means to mount said trough guide means for movement between a retracted position and a transducing position, said mounting means including a mounting block having a pair of mutually perpendicular surfaces, said support means having a pair of complementary mutually perpendicular surfaces, and means to urge the surfaces on said block into engagement with said complementing surfaces; and means to drive said trough guide means between said retracted and transducing positions.

12. The apparatus recited in claim 11 including further bearing means on said support to position said trough guide means angularly about the axis of said shaft.

13. The apparatus recited in claim 11 including means to position said mounting block in a direction parallel to said complementing surfaces.

14. The apparatus recited in claim 13 in which said positioning means includes a cam member, means to move said cam member against one side of said mounting block, and yieldable means to bias said block against said cam member.

15. The apparatus recited in claim 11 in which said mounting means includes a shaft connected at one end to said trough guide means and including bearing means to support said shaft for rectilinear axial movement in said mounting block.

16. The apparatus recited in claim 15 including a nut threaded on the other end of said shaft, and a coil spring concentrically positioned about said shaft and acting between said mounting block and said nut to bias said shaft and the trough guide means to said retracted position.

17. The apparatus recited in claim 16 in which said nut has an abutment surface thereon to engage mounting block and establish said transducing position.

References Cited

UNITED STATES PATENTS

| | | | |
|---|---|---|---|
| 3,208,682 | 9/1965 | Pastor et al. | 179—100.2 |
| 2,894,700 | 7/1959 | Roberts et al. | 179—100.2 |
| 3,268,877 | 8/1966 | Hagan | 179—100.2 |

BERNARD KONICK, Primary Examiner

J. ROSENBLATT, Assistant Examiner

U.S. Cl. X.R.

179—100.2

PO-1050
(5/69)

UNITED STATES PATENT OFFICE
CERTIFICATE OF CORRECTION

Patent No. 3,518,647 Dated June 30, 1970

Inventor(s) J. A. Altonji et al

It is certified that error appears in the above-identified patent and that said Letters Patent are hereby corrected as shown below:

Column 3, line 4, change "manually" to --mutually--.

Column 5, line 20, change "it" to --its--.

Column 5, line 31, change "tap" to --tape--.

Column 6, line 44, change "4" to --5--.

Column 6, line 51, change "1" to --7--.

Signed and sealed this 22nd day of June 1971.

(SEAL)
Attest:

EDWARD M.FLETCHER,JR.
Attesting Officer

WILLIAM E. SCHUYLER, JR.
Commissioner of Patents